C. E. DAVEY.
VALVE.
APPLICATION FILED JUNE 16, 1909.
949,115.
Patented Feb. 15, 1910.
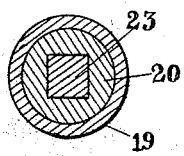
Fig. 2
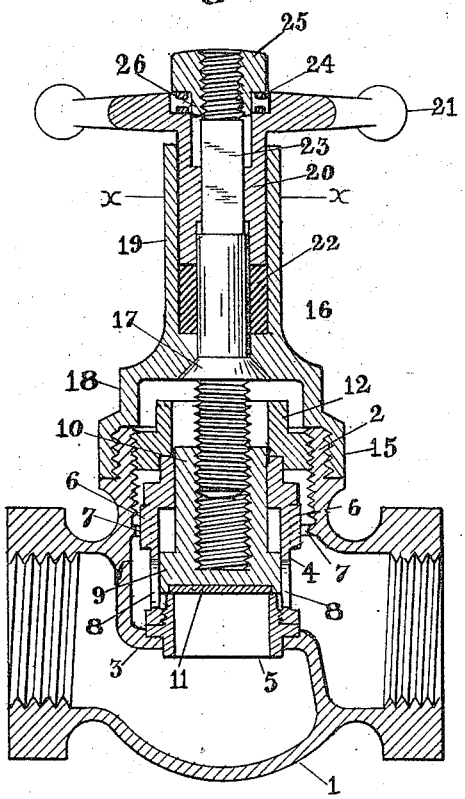
Fig. 1
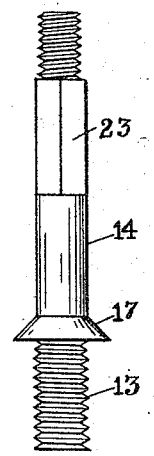
Fig. 3
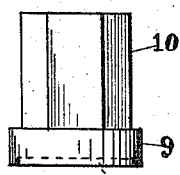
Fig. 4
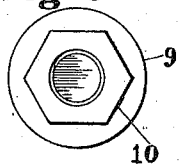
Fig. 5
Fig. 8
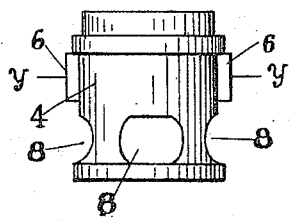
Fig. 6
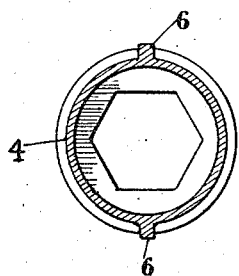
Fig. 7
WITNESSES:
A. M. Shannon
A. M. Dow
INVENTOR
CHARLES E. DAVEY
BY
ATTORNEYS

UNITED STATES PATENT OFFICE.

CHARLES E. DAVEY, OF DETROIT, MICHIGAN.

VALVE.

949,115.      Specification of Letters Patent.      Patented Feb. 15, 1910.

Application filed June 16, 1909. Serial No. 502,436.

*To all whom it may concern:*

Be it known that I, CHARLES E. DAVEY, a citizen of the United States of America, residing at Detroit, in the county of Wayne and State of Michigan, have invented certain new and useful Improvements in Valves, of which the following is a specification, reference being had therein to the accompanying drawings.

This invention relates to valves and to an arrangement thereof especially adapting them to use under high pressures, and permitting rapid adjustment or take up to prevent leakage under such pressures.

The invention consists in the matters hereinafter set forth and more particularly pointed out in the appended claims.

In the drawings, Figure 1 is a view in longitudinal section of a valve embodying features of the invention; Fig. 2 is a view in section on line $x$—$x$ of Fig. 1; Fig. 3 is a view in detail of a valve spindle; Figs. 4 and 5 are views in detail of a valve closure; Fig. 6 is a view in elevation of a closure cage; Fig. 7 is a view in section on line $y$—$y$ of Fig. 6; and Fig. 8 is a view in detail of a cage bushing.

Referring to the drawings, a casing 1 of suitable design and material, fitted at the ends in the usual manner for connection with pipes, has an annular lateral flange 2 in axial alinement with a circular opening in a diaphragm 3 dividing the interior of the casing. A cylindrical cage 4 has a flanged collar 5 detachably secured in its lower end and adapted to be seated in the opening of the diaphragm 3 which is counterbored to receive it, ribs 6 on the cage engaging lugs 7 on the casing to prevent rotation. There are openings 8 in the cage wall just above the collar 5. The latter forms an annular seat for a cylindrical closure 9 reciprocable in the cage, a squared or polygonal stem 10 having sliding engagement with the correspondingly apertured upper end of the cage to prevent rotation of the closure. A soft metal disk 11 in-set in the closure end, insures a close joint with the collar 5. A bushing 12 screw-threaded or otherwise detachably secured in the flange 2, retains the cage in position.

The closure stem 10 has an axial aperture in its upper end with a screw thread of comparatively coarse pitch, preferably left handed, which is engaged by the correspondingly threaded end 13 of a spindle 14. A bonnet 15 adapted to be screw-threaded onto or otherwise detachably secured over the flange 2 as a housing for the cage, has an annular beveled flange 16 in which a correspondingly formed collar 17 of the spindle 14 is rotatably seated. The housing which is adapted as indicated at 18 for the application of a wrench, has a cylindrical extension 19 of sufficient length to form a bearing for a depending hub 20 of a hand wheel 21, and permit the introduction of a considerable body of packing 22 around the stem 14, the packing being preferably metallic. The hub 20 is apertured to non-rotatably reciprocate on a square polygonal, or splined portion 23 of the spindle. The hand wheel and hub are yieldingly forced against the packing 22 by a spring washer 24 seated in a counterbored recess on the outer face of the hand-wheel and compressed by a nut 25 screw-threaded on to the spindle end an annular flange 26 on the nut extending through the washer 24 into a counterbored guide aperture of the wheel hub. By this arrangement of parts the operating spindle of the valve closure does not reciprocate through the packing and this, in conjunction with the ground joint obtainable between the spindle collar and bonnet flange, reduces liability to leakage even under heavy pressure. Furthermore, the adjusting nut is outside the hand-wheel and is instantly accessible. If the nut is turned down too far, so that the spindle sticks, it may be slacked away slightly and the spring washer retains the packing with sufficient force to prevent leakage. The accessibility of the parts and the ease with which they may be properly machined, fitted and assembled, are also valuable features of the invention.

Obviously, details of construction may be changed without departing from the spirit of the invention, and I do not limit myself to any particular form or arrangement of parts.

Having thus fully described my invention what I claim is:

1. A valve comprising a casing having a transverse apertured diaphragm and a laterally extending annular flange in substantially axial alinement with the diaphragm aperture, a cage removably secured on the diaphragm aperture and provided with a valve seat and lateral openings above the seat, a closure for the cage seat, non-rotatable and longitudinally reciprocable in the cage, a spindle having an inner end in screw-threaded engagement with the closure, a thrust collar on the spindle, a bonnet detachably secured on the casing flange as a housing for the cage and spindle, and provided with an inner annular flange engaging the spindle collar, a hand-wheel provided with a hub extending into the outer end of the housing in non-rotatable sliding engagement with the spindle, and adjusting means adapted to yieldingly force the hand-wheel toward the spindle collar.

2. A valve comprising a casing having a transverse apertured diaphragm and a laterally extending annular flange in substantially axial alinement with the diaphragm aperture, a cage removably secured on the diaphragm aperture and provided with a valve seat and lateral openings above the seat, a closure for the cage seat, non-rotatable and longitudinally reciprocable in the cage, a spindle having an inner end in screw-threaded engagement with the closure, a thrust collar on the spindle, a bonnet detachably secured on the casing flange as a housing for the cage and spindle, and provided with an inner annular flange engaging the spindle collar, a hand-wheel provided with a hub extending into the outer end of the housing in non-rotatable, sliding engagement with the spindle, a body of packing around the spindle between the hub and spindle collar, and adjusting means to yieldingly force the hand-wheel hub against the packing.

3. A valve comprising a casing having a transverse apertured diaphragm and a laterally extending annular flange in substantially axial alinement with the diaphragm aperture, a cage removably secured on the diaphragm aperture and provided with a valve seat and lateral openings above the seat, a closure for the cage seat, non-rotatable and longitudinally reciprocable in the cage, a spindle having an inner end in screw-threaded engagement with the closure, a thrust collar on the spindle, a bonnet detachably secured on the casing flange as a housing for the cage and the spindle collar, a hand-wheel provided with a hub extending into the outer end of the housing in non-rotatable, sliding engagement with the spindle, a nut longitudinally adjustable on the outer end of the spindle, and a spring washer in compression between the nut and the wheel hub.

4. A valve comprising a casing having a transverse, apertured diaphragm and a laterally extending annular flange in substantially axial alinement with the diaphragm aperture, a closure cage removably secured on the diaphragm aperture and provided with an apertured seat and lateral openings above the seat, a closure for the cage seat, non-rotatable and longitudinally reciproca-ble in the cage, a spindle whose inner end is in screw-threaded engagement with an aperture in the upper end of the closure, a thrust collar on the spindle, a bonnet detachably secured on the casing flange as a housing for the casing, and provided with a cylindrical extension concentric with the spindle, and with an inner flange in contact with the outer face of the spindle thrust collar, a hand-wheel having a hub in non-rotatable, sliding engagement with the spindle and rotatable, sliding engagement with the bonnet extension, forming with the latter a stuffing box for the spindle, a nut adjustable on the outer end of the spindle, and a spring encircling the spindle in compression between the nut and the wheel hub.

5. A valve comprising a casing divided by a transverse diaphragm having a circular aperture with counterbored rim, and a lateral, annular flange in axial alinement with the diaphragm aperture, a cylindrical, laterally apertured cage having a detachable, annular valve seat on its inner end resting on the counterbored rim of the diaphragm aperture, a bushing detachably engaging the casing flange and bearing against the upper end of the cage, a closure in the cage whose lower end is adapted to engage the seat and whose upper end has non-rotatable, sliding engagement with the cage, lugs on the interior of the casing interlocking with the ribs on the cage, a spindle whose inner end is in screw-threaded engagement with the closure, a thrust collar on the spindle, a bonnet detachably secured on the casing flange as a housing for the cage and spindle, and provided with an inner, annular flange engaging the spindle collar, a hand-wheel provided with a hub extending into the outer end of the housing in non-rotatable sliding engagement with the spindle, a nut longitudinally adjustable on the outer end of the spindle, and a spring washer in compression between the nut and the wheel hub.

6. A valve comprising a casing divided by a transverse diaphragm having a circular flange in axial alinement with the diaphragm aperture, a cylindrical, laterally apertured cage having a detachable, annular valve seat on its inner end resting on the counterbored rim of the diaphragm aperture, a bushing detachably engaging the casing flange and bearing against the upper end of the cage, a closure in the cage whose lower end is adapted to engage the seat and whose upper end has non-rotatable, sliding engagement with the cage, lugs on the interior of the casing interlocking with ribs on the cage, a spindle whose inner end is in screw-threaded engagement with an aperture in the upper end of the closure, a beveled thrust collar on the spindle, a bonnet detachably secured on the casing flange as a housing for the casing and provided with a cylindrical extension concentric with the spindle and with an inner beveled flange in contact with the bevel face of the spindle thrust collar, a hand-wheel having a hub in non-rotatable sliding engagement with the spindle and rotatable, sliding engagement with the bonnet extension, forming with the latter a stuffing box for the spindle, a nut adjustable on the outer end of the spindle, and a spring encircling the spindle in compression between the nut and the wheel hub.

In testimony whereof I affix my signature in presence of two witnesses.

CHARLES E. DAVEY.

Witnesses:
C. R. STICKNEY,
A. M. SHANNON.